United States Patent
Yang

(10) Patent No.: US 11,145,923 B2
(45) Date of Patent: Oct. 12, 2021

(54) BATTERY STRUCTURE

(71) Applicants: Prologium Technology Co., Ltd., Taoyuan (TW); Prologium Holding Inc., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 208 days.

(21) Appl. No.: 15/727,694

(22) Filed: Oct. 9, 2017

(65) Prior Publication Data
US 2018/0108879 A1    Apr. 19, 2018

Related U.S. Application Data

(60) Provisional application No. 62/407,571, filed on Oct. 13, 2016.

(51) Int. Cl.
| | |
|---|---|
| *H01M 50/10* | (2021.01) |
| *H01M 10/42* | (2006.01) |
| *H01M 10/04* | (2006.01) |
| *H01M 10/052* | (2010.01) |
| *H01M 10/0585* | (2010.01) |

(Continued)

(52) U.S. Cl.
CPC ....... *H01M 50/10* (2021.01); *H01M 10/0436* (2013.01); *H01M 10/052* (2013.01); *H01M 10/0585* (2013.01); *H01M 10/425* (2013.01); *H01M 50/124* (2021.01); *H01M 50/116* (2021.01); *H01M 2220/30* (2013.01)

(58) Field of Classification Search
CPC ............ H01M 2/0202; H01M 2/0287; H01M 2/0277; H01M 2/029; H01M 10/0585; H01M 10/0436
See application file for complete search history.

(56) References Cited

U.S. PATENT DOCUMENTS

| | | | | |
|---|---|---|---|---|
| 7,166,385 | B2* | 1/2007 | Ishida ................. | H01M 2/0212 429/122 |
| 9,515,316 | B2* | 12/2016 | Yokouchi ............ | H01M 4/1391 |
| 9,837,651 | B2* | 12/2017 | Huang ................ | H01M 2/1094 |

FOREIGN PATENT DOCUMENTS

| | | | |
|---|---|---|---|
| JP | 6052866 | * | 2/1994 |
| JP | 6052866 A | * | 2/1994 |

(Continued)

*Primary Examiner* — Ula C Ruddock
*Assistant Examiner* — Thomas H. Parsons
(74) *Attorney, Agent, or Firm* — Rabin & Berdo, P.C.

(57) ABSTRACT

A battery having a protective isolation structure is disclosed comprising a first current collecting layer, a first active material layer, a spacer layer, a first glue frame, a second active material and a second current collecting layer. The first active material layer is disposed on the first current collecting layer. The spacer layer is disposed on the first active material layer. The area of the spacer layer is smaller than the area of the first active material layer so that a part of the first active material layer is exposed outside the spacer layer. The first glue frame is covering the top surface of the first active material layer exposed from the spacer layer and has a protrusion disposed on the surface of the spacer layer. The second active material layer is disposed on the surface of the spacer layer and the protrusion. The second current collecting layer is disposed on the second active material layer.

15 Claims, 3 Drawing Sheets

(51) Int. Cl.
 *H01M 50/124* (2021.01)
 *H01M 50/116* (2021.01)

(56) References Cited

FOREIGN PATENT DOCUMENTS

| | | | |
|---|---|---|---|
| JP | 2015076179 | * | 4/2015 |
| JP | 2015076179 A | * | 4/2015 |

* cited by examiner

BATTERY STRUCTURE

This Non-provisional application claims priority under 35 U.S.C. § 119(a) on Patent Application No. 62/407,571 filed in United States on Oct. 13, 2016, the entire contents of which are hereby incorporated by reference.

BACKGROUND

1. Technical Field

The present invention relates to a battery structure, particularly to a battery having a structure of protection and isolation.

2. Description of Related Art

Wearable electronic devices are becoming increasing popular. For the purpose of lighter and thinner, to divide the space of electronic devices becomes an important topic. However, flexible battery provides a solution to the topic. Please refer to FIG. 1, FIG. 1 shows a section view of conventional flexible lithium battery. As the figure shows, the flexible lithium battery comprises a top current collector 12, a bottom current collector 14, an outer package 16 interposed between the top current collector 12 and the bottom current collector 14 so that an enclosed space 18 is form. The enclosed space 18 comprises in the order of a first active material layer 20, a spacer layer 22 and a second active material layer 24. The first active material layer 20, the spacer layer 22 and the second active material layer 24 form an electric chemical system layer, and the first active material layer 20 is contact to the top current collector 12, the second active material layer 24 is contact to the bottom current collector 14. The feature of the flexible lithium battery is that the whole battery can dynamic flex.

Furthermore, on the structural design of lithium battery, the horizontal area of the positive active material layer is smaller than the horizontal area of the negative active material layer because if the anode accepts excessive lithium ion from the cathode, the extra lithium ion would deposit and form lithium dendrite and even cause inner short. However, the conventional protective solutions only rely on keeping close tabs on the horizontal area of the positive active material layer and the negative active material layer via process.

Accordingly, a battery structure is provided to overcome the above problems.

SUMMARY OF THE INVENTION

It is an objection of this invention to provide a battery structure. The first glue frame extends to the top surface of the spacer layer and forms a protruding part, the active material layer which exposed from the spacer layer and/or the current collector layer which exposed from the active material layer are/is covered. So as to prevent that lithium ions deposit on the exposed active material layer and/or the current collector layer.

It is another objection of this invention to provide a battery structure. The first glue frame covers the area of the second material layer which correspond to the first active material so as to maintain the A/C ratio of lithium battery and reduce the probability and degree of forming lithium dendrite. This battery structure provides one of a solution to prevent inner short.

It is another objection of this invention to provide a battery structure. The protruding part of the first glue frame extends to the top surface of the spacer to enhance the structural strength of the edge of top surface of the spacer layer. This battery structure can reduce the chance of the deformation or rupture of the edge of the spacer layer. This battery structure can prevent the problem of inner short that cause by the contact of cathode and anode.

It is another objection of this invention to provide a battery structure. The spacer layer and the protruding part isolate the first active material layer from the second active material layer.

For above objections, the present invention discloses a battery structure, the battery structure comprises a first current collector layer; a first active material layer, disposed on the first current collector layer; a spacer layer, disposed on the first active material layer, the horizontal area of the spacer layer is smaller than the horizontal area of the first active material layer, so parts of a top surface of the first active material layer is exposed from the spacer layer; a first glue frame, covering the parts of the top surface of the first active material layer, the top of the first glue frame has a protruding part, the protruding part extends to the edge of a top surface of the spacer layer; a second active material layer, disposed on the spacer layer and the protruding part, isolated from the first active material layer via the spacer layer and the protruding part; and a second current collector layer, disposed on the second active material layer.

It is another objection of this invention to provide a battery structure. The protruding part of the first glue frame and the spacer layer are isolated structure that isolate the first active material layer from the second active material layer.

Further scope of applicability of the present invention will become apparent from the detailed description given hereinafter.

DETAILED DESCRIPTION

Figure 1:
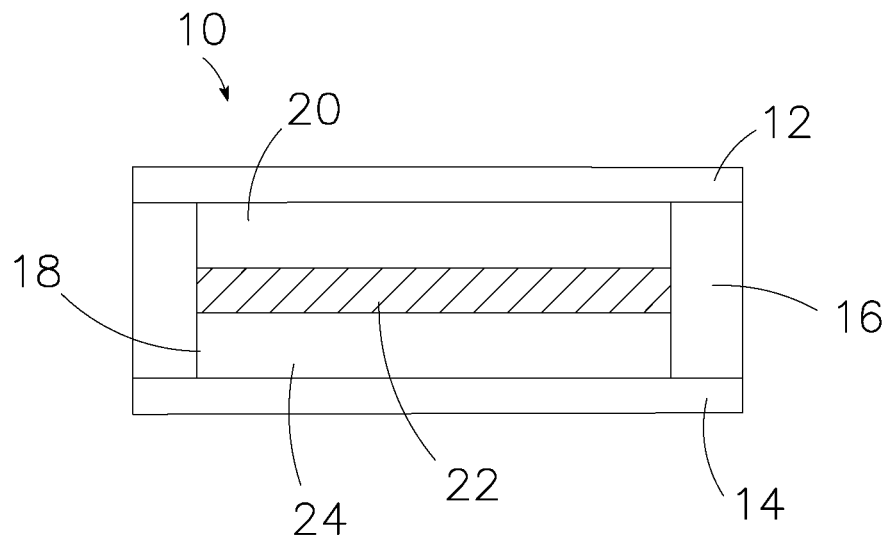
FIG. 1 illustrates the sectional view of conventional flexible battery.
Figure 2:
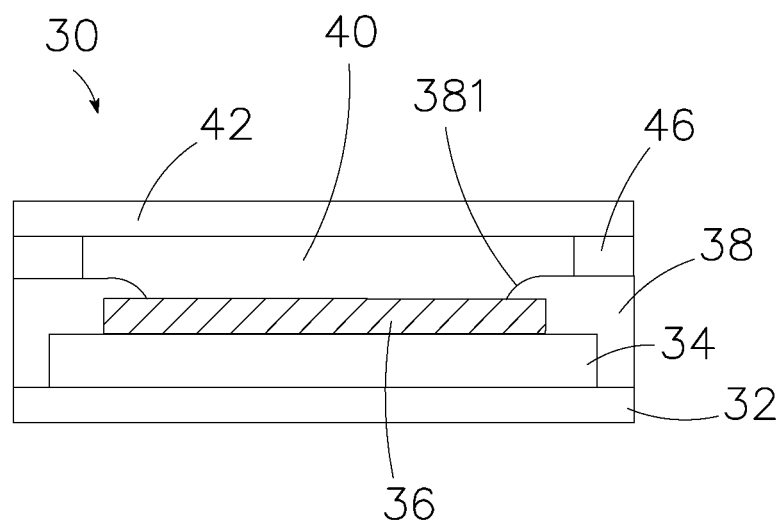
FIG. 2 illustrates the battery structure of this present invention.

Referring to FIG. 2, FIG. 2 is an embodiment of the flexible battery. As shown in FIG. 2, the lithium battery 30 mainly comprises a first current collector layer 32; a first active material layer 34 which disposed on the first current collector layer 32, the horizontal area of the first active material layer 34 is smaller than the horizontal area of the first current collector layer 32 so that parts of the first current collector layer 32 is exposed from the first active material layer 34; a spacer layer 36 which disposed on the first active material layer 34, the horizontal area of the spacer layer 36 is smaller than the horizontal area of the first active material layer 34 so that parts of top of the first active material layer 34 is exposed from the spacer layer 36; a first glue frame 38, covering the top of the first active material layer 34 which exposed from the spacer layer 36, and the top of the first glue frame 38 has a protruding part 381, the protruding part 381 is extend to the edge of the top surface of the spacer layer 36; a second active material 40, disposed on the spacer layer 36 and the protruding part 381, isolating from the first active material layer 34 via the spacer layer 36 and the protruding part 381; a second current collector layer 42, disposed on the second active material layer 40; a second glue frame 46, the top of the second glue frame 46 is disposed on the second current collector 42 and encloses the peripheral of the second active material layer 40, the bottom of the second glue frame 46 is adjacent to the first glue frame 38, more specifically, the bottom of the second glue frame 46 is directly contact with the protruding part 381 of the first glue frame 38.

In above structure, the parts of first active material layer 34 which exposed from the spacer layer 36 is covered by the protruding part 381, in this embodiment, the parts of first current collector layer 32 which exposed from the first active material 34 is covered at the same time. One of the purpose of covering the exposed first active material 34 layer is to maintain the A/C ratio of lithium battery 30. A/C ratio is an important parameter of battery design, which determines the efficiency of the intercalation/deintercalation of lithium ion during electric chemical reaction. Generally, lots of lithium dendrite would produce in anode if the efficiency of the intercalation/deintercalation of lithium ion were not enough, once the lithium dendrite pierce the spacer layer 36, inner short may happen.

In general battery design, A/C ratio usually control via the chemical recipe, coating area of electrode or coating density of electrode so as to reduce the probability and degree of forming lithium dendrite. However, in addition to above solutions, the present invention uses the protruding parts 381 to control the A/C ratio, and to maintain safety and electrical performance. One of the purpose of covering the exposed first current collector layer 32 is to prevent lithium ions depositing on the first current collector 32. If the lithium ions deposit on the first current collector 32, the concentration of the lithium ion in lithium battery 30 would decrease and the lithium battery 30 would explored because of the lithium dendrite.

In addition to the above mentions, the protruding part 381 of the first glue frame 38 extends to the edge of the top surface of the spacer layer 36 that improve the structural stability of lithium battery 30. In flexible battery, the spacer layer 36 usually curved or deformation after bending several times and even cause inner short. However, the contact between the spacer layer 36 and the first active material layer 34, the spacer layer 36 and the second active material layer 40 can be effectively maintained, and the deformation of the edge of the spacer layer 36 can be prevented when the protruding part 381 extends to the edge of the top surface of the spacer layer 36 regardless in polymer spacer layer, polymer spacer layer which has special effect coating or ceramic spacer layer. The protruding part 381 effectively enhance the structural strength of the edge of the spacer layer 36 especially in ceramic spacer.

Moreover, in the above structure, the protruding part 381 of the first glue frame and the spacer layer 36 are new hybrid isolated structure that isolate the first active material layer 34 from the second active material layer 40. Furthermore, the first current collector layer 32 or the second current collector can be the conductive surface of circuit board.

Figure 3:
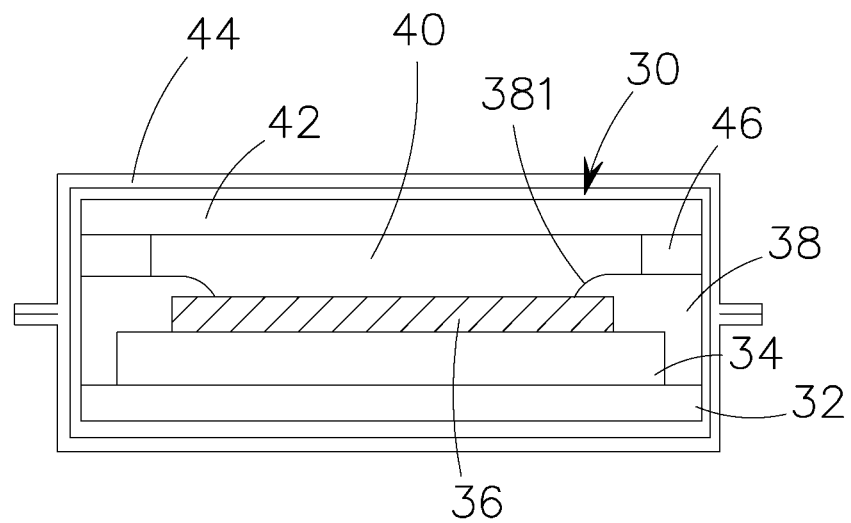
FIG. 3 illustrates the battery structure of this present invention.

Please refer to FIG. 3, which pack the lithium battery 30 in an aluminum foil bag 44, the aluminum foil bag 44 can prevent the leakage of electrolyte and block moisture and oxygen from outside environment.

Figure 4:
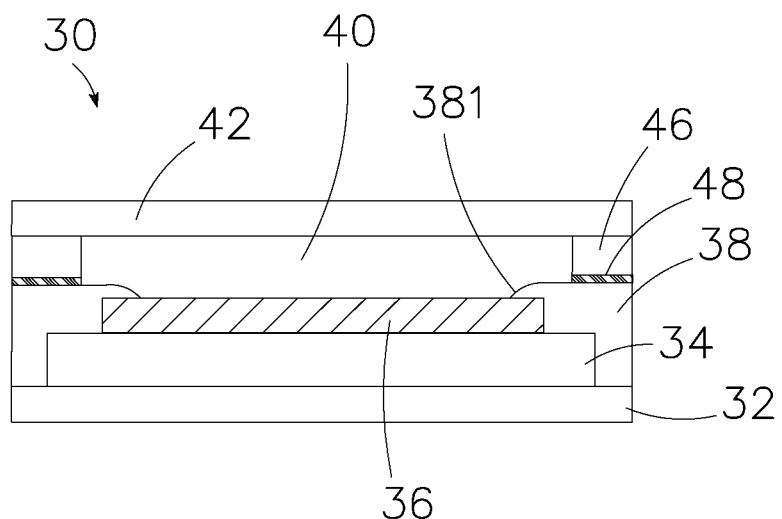
FIG. 4 illustrates the battery structure of this present invention.

Please refer to FIG. 4, FIG. 4 illustrates a battery structure of this present invention. The lithium battery 30 further comprises a third glue frame 48, the bottom of the second glue frame 46 is adjacent to the top of the third glue frame 48, the bottom of the third glue frame 48 is adjacent to the top of the first glue frame 38. The first glue frame 38 and the second glue frame 46 have the better heterogeneous surface adhesion than the third glue frame 48, the third glue frame 48 has the best homogeneous surface adhesion of the first glue frame 38, the second glue frame 46 and the third glue frame 48. The third glue frame 48 bonds the first glue frame 38 and the second glue frame 46 tightly.

Figure 5:
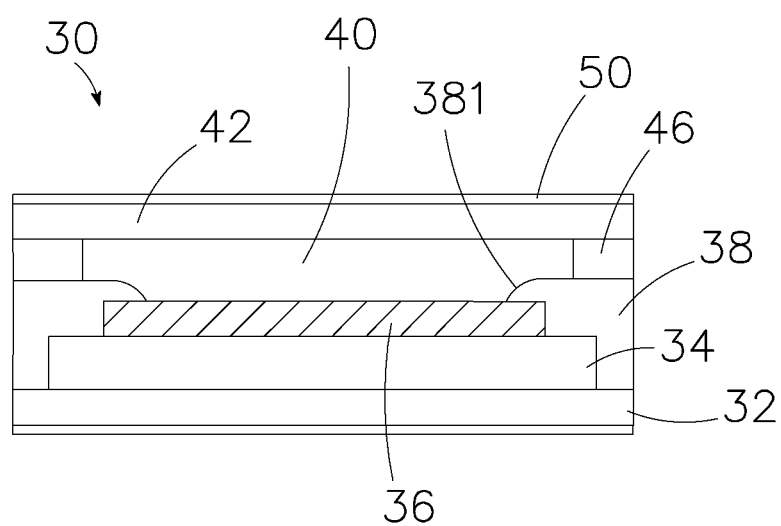
FIG. 5 illustrates the battery structure of this present invention.

However, the first glue frame 38, the second glue frame 46 and the third glue frame 48 can be an independent structure respectively or can integrate into a single structure. Moreover, the outer surface of the first current collector layer 32 and/or the second current collector layer 42 further have/has a protection layer 50. For example, FIG. 5 illustrates the battery structure, which has the protection layer 50. The protection layer 50 can prevent the contact between outside environment with the first current collector layer 32 and/or the second current collector layer 42. The protection layer 50 can protect the first current collector layer 32 and/or the second current collector layer 42 from rupture during bending the lithium battery 30.

Furthermore, the first glue frame 38, the second glue frame 46, the third glue frame 48 and the protection layer 50 can further cover the edge of the first current collector layer 32 and the second current collector layer 42. The situation of external short that cause by the contact of the first current collector layer 32 and the second current collector layer 42 during bending of the lithium battery 30 can be reduced via the insulation characteristic of the first glue frame 38, the second glue frame 46, the third glue frame 48 and the protection layer 50. The protection layer 50 could coat the edge of the first current collector layer 32 and the second current collector layer 42 in different structures depending on the battery design or the process requirements. The protection layer 50 may be single layer coating and multi-layer coating.

The materials of the first glue frame 38, the second glue frame 46, the third glue frame 48 and the protection layer 50 are selected from the electric insulation polymer such as polyimide, epoxy, acrylic resin, and silicone. The materials of the spacer layer 36 are selected from polymer material, ceramic material, glass ceramic material or glass fiber material. The first active material layer 34, the second material layer 40 and the spacer layer 36 absorb an electrolyte. The electrolyte is liquid electrolyte, gel-type electrolyte or solid state electrolyte.

In summary, the protruding part of the first glue frame covers the current collector which exposed from the active material layer. The situation of inner short that lithium dendrite formed on the current collector and puncture the spacer layer can be prevented. Moreover, the first glue frame can cover the area of the second material layer which correspond to the first active material so that the inner short can be prevented.

The invention being thus described; it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery structure, comprising:
   a first current collector layer;

a first active material layer, disposed on the first current collector layer;

a spacer layer, disposed on the first active material layer, wherein a horizontal area of the spacer layer is smaller than a horizontal area of the first active material layer, and parts of a top surface of the first active material layer are exposed from the spacer layer;

a first glue frame, covering the parts of the top surface of the first active material layer exposed from the spacer layer, wherein a top of the first glue frame has a protruding part;

a second active material layer, disposed on the spacer layer and the protruding part, isolated from the first active material layer via the spacer layer and the protruding part; and a second current collector layer, disposed on the second active material layer;

wherein the protruding part extends inwardly to directly contact and partly cover a top surface of the spacer layer between the top surface of the spacer layer and a bottom surface of the second active material layer and beyond a peripheral surface of the spacer layer and a peripheral surface of the second active material layer, and the spacer layer directly contacts the second active material layer.

2. The battery structure of claim 1, wherein a bottom of the first glue frame is disposed on the first current collector layer and the first glue frame encloses a periphery of the first active material layer and the spacer layer.

3. The battery structure of claim 1, further comprising a second glue frame interposed used between the first glue frame and the second current collector layer, wherein a top of the second glue frame is adjacent to the second current collector layer and the second glue frame encloses a periphery of the second material layer, and a bottom of the second glue frame is adjacent to the first glue frame.

4. The battery structure of claim 3, wherein the top of the second glue frame is adjacent to the second current collector.

5. The battery structure of claim 3, wherein materials of the second glue frame and the third glue frame are selected from polyimide, epoxy, acrylic resin or silicone.

6. The battery structure of claim 1, further comprising a second glue frame and a third glue frame, wherein the second glue frame encloses a periphery of the second current collector, a bottom of the second glue frame is adjacent to a top of the third glue frame, and a bottom of the third glue frame is adjacent to the top of the first glue frame.

7. The battery structure of claim 6, wherein the first glue frame and the second glue frame have a better heterogeneous surface adhesion than the third glue frame, and the third glue frame has a best homogeneous surface adhesion of the first glue frame, the second glue frame and the third glue frame.

8. The battery structure of claim 6, wherein materials of the first glue frame, the second glue frame and the third glue frame are selected from polyimide, epoxy, acrylic resin or silicone.

9. The battery structure of claim 1, wherein the first current collector or the second current collector is a conductive surface of a circuit board.

10. The battery structure of claim 1, wherein materials of the first glue frame are selected from polyimide, epoxy, acrylic resin or silicone.

11. The battery structure of claim 1, wherein materials of the spacer layer are selected from polymer material, ceramic material, glass ceramic material or glass fiber material.

12. The battery structure of claim 1, wherein the first active material layer, the second material layer and the spacer layer absorb an electrolyte, and the electrolyte is a liquid electrolyte, a gel-type electrolyte or a solid state electrolyte.

13. The battery structure of claim 1, further comprising an aluminum foil pouch to accommodate and enclose the battery.

14. The battery structure of claim 1, wherein an outer surface of the first current collector layer and the second current collector layer further has a protection layer.

15. The battery structure of claim 14, wherein materials of the protection layer are selected from polyimide, epoxy, acrylic resin or silicone.

* * * * *